Nov. 27, 1956 B. T. KENNEDY 2,771,987

PACKAGING FOR ELECTRONIC EQUIPMENT OR THE LIKE

Filed Jan. 14, 1955 2 Sheets-Sheet 1

BENEDICT T. KENNEDY

INVENTOR.

BY [signature]

HIS ATTORNEY

Nov. 27, 1956 B. T. KENNEDY 2,771,987

PACKAGING FOR ELECTRONIC EQUIPMENT OR THE LIKE

Filed Jan. 14, 1955 2 Sheets-Sheet 2

BENEDICT T. KENNEDY

INVENTOR.

BY Bruce L. Birchard

HIS ATTORNEY

United States Patent Office 2,771,987

Patented Nov. 27, 1956

2,771,987

PACKAGING FOR ELECTRONIC EQUIPMENT OR THE LIKE

Benedict T. Kennedy, Long Beach, Calif., assignor to Hoffman Electronics Corporation, a corporation of California Application January 14, 1955, Serial No. 481,750

2 Claims. (Cl. 206—46)

This invention is related to packaging techniques and, more particularly, to an improved system of packaging electronic equipment preparatory to shipment. It is highly desirable that electronic equipment be packaged preparatory to shipment so as to preclude the undesirable corrosive effects of internal water vapor and external moisture. Packaging techniques presently employed include the desirable feature of including within the covering and adjacent the electronic equipment several small packages or capsules of dehydrating agents, commonly called desiccants. The inclusion of a suitable dehydrating agent will, of course, greatly facilitate the objective of removing moisture from the air within the electronic equipment covering. The configuration of the protective covering itself, however, as necessitated by the requirement of an appropriate mounting base, has in the past presented somewhat of a problem, as shall be indicated in later discussions of the relevant figures.

Therefore, it is an object of this invention to provide a new and useful system of packaging electronic equipment preparatory to shipment thereof.

It is a further object of the present invention to provide a new and useful system of packaging electronic equipment preparatory to shipment which will insure optimum protection of this equipment while maintaining shipping weight and cost at a minimum.

According to the present invention, the electronic equipment is packaged in a moisture- and vapor-proof covering which is sealed in a conventional manner. This sealed equipment is mounted upon an angular base cushion material which is disposed within the upper rectangular indentation of an appropriate mounting base. The equipment is secured to the base by conventional steel strapping. An additional base is securely affixed to the aforementioned base, and serves to accommodate a crate disposed over the electronic equipment by being itself affixed thereto.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
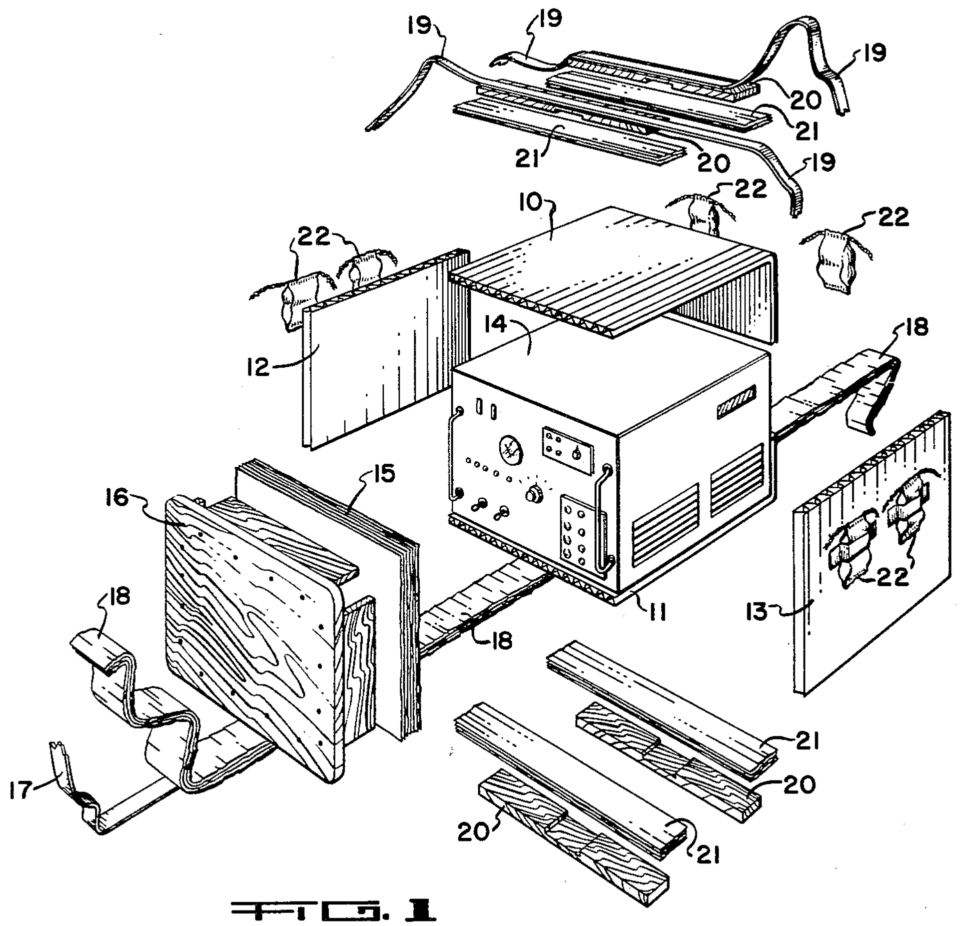
Figure 1 is an exploded view of a unit of electronic equipment pre-wrapped in protective corrugated pads.

In Figure 1 corrugated pads 10, 11, 12 and 13 are disposed to enclose all but the front panel of electronic unit 14. Cushion 15 and front face plate 16 are secured to the panel of unit 14 by means of strapping 17 which is disposed around unit 14 over cushioning strip 18. Corrugated pads 10, 11, 12 and 13 are pressed against the sides of unit 14 by means of steel strappings 19, which are disposed over protective cleats 20 resting upon cushioning cleats 21. Desiccant units 22 are provided for disposition between the corrugated pads and the moisture- and vapor-proof protective cover (not shown in this figure).

Figure 2:
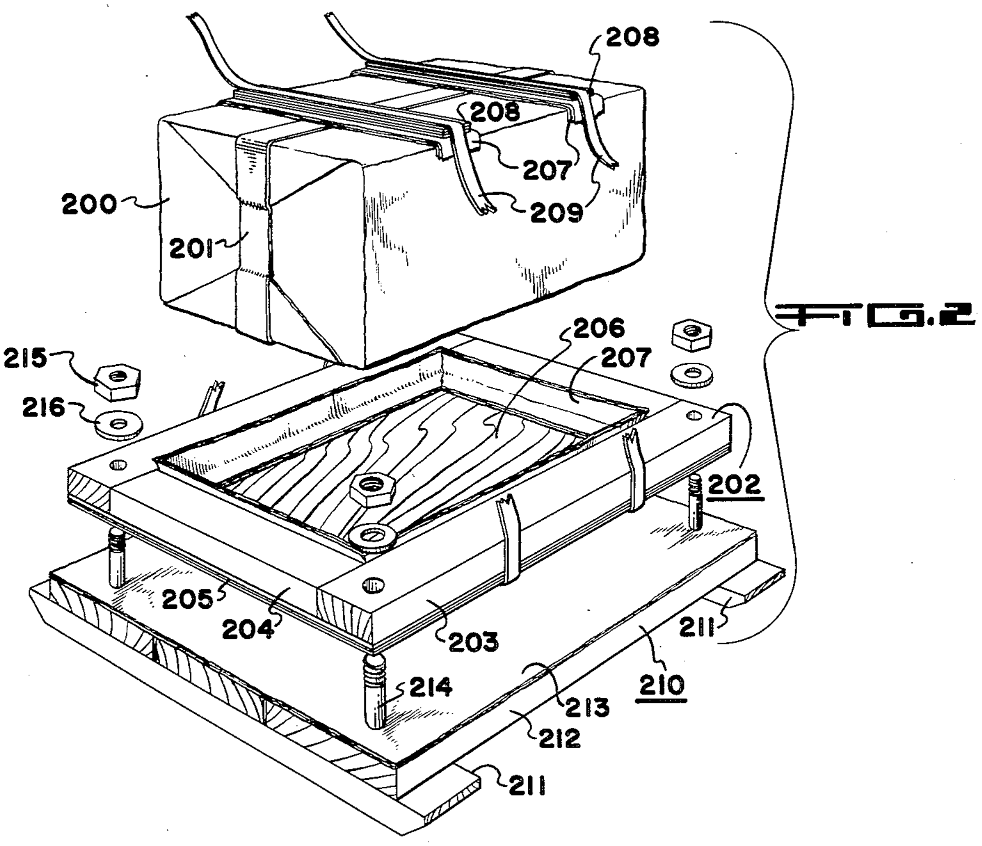
Figure 2 is a perspective view of the pre-wrapped electronic unit of Figure 1 sealed within a moisture- and vapor-proof protective cover and mounted on a pallet base.

In Figure 2 electronic unit 14 of Figure 1 is shown wrapped in moisture- and vapor-proof protective cover 200, the seams of which are made air-tight by virtue of seal 201. Base pallet 202 is shown consisting of two wooden strips 203, two wooden strips 204 and plywood backing 205. By virtue of this construction, base pallet 202 is shown to have upper indentation area 206 which serves to accommodate the placement of the base of the wrapped electronic unit upon angular cushioning material 207. Cushioning strips 207 and protective wooden cleats 208 protect moisture- and vapor-proof protective cover 200 from the chafing of steel strappings 209. Crate base 210, shown consisting of two wooden skids 211, wooden base 212, and water-proof sheeting 213, is secured affixed to base pallet 202 by means of attachments consisting of four bolts 214, four nuts 215 and four washers 216.

While the particular configuration of base pallet 202 as shown in Figure 2 is not novel, yet it is the practice of the electronics industry to place the corrugation-padded electronic equipment upon base pallet 202 within indentation area 206 but without the inclusion of angular cushioning material 207, and to enclose both base pallet 202 and the electronic unit within a moisture- and vapor-proof protective cover. Then, the electronic unit is secured to base pallet 202 by means of strappings 209. For such a configuration washers 216 would be omitted, nuts 215 would be stop nuts, and moisture- and vapor-proof protective cover 200 would include access holes to accommodate bolts 214. With such a configuration, however, there are dangers of puncturing the moisture- and vapor-proof protective cover at its side areas. In addition, difficulty is experienced in properly sealing the moisture- and vapor-proof protective cover after it is evacuated. Further, the protective cover holes serving as access holes for bolts 214 contribute to the sealing problem difficulty. Conventional commercial and military packaging specifications require that the size of the enclosing crate be three inches or more away from the sides of protective cover 14. It is apparent that conforming to such specifications will increase necessarily the dimensions of base 210 and the length and width dimensions of the crating associated therewith. This is self-evident by reason of the fact that under conventional packaging systems protective cover 200 will envelop base pallet 202 in addition to the electronic equipment. From the applicant's packaging scheme, as indicated in Figure 2, the danger of protective cover puncture is avoided and the dimensions of base 210 and the crating associated therewith is reduced to a minimum. A packaging weight breakdown indicates that there is a considerable weight reduction when employing the applicant's backing system, and this weight reduction accompanies the primary objective namely, that a better protective covering is afforded packaged electronic equipment.

Figure 3:
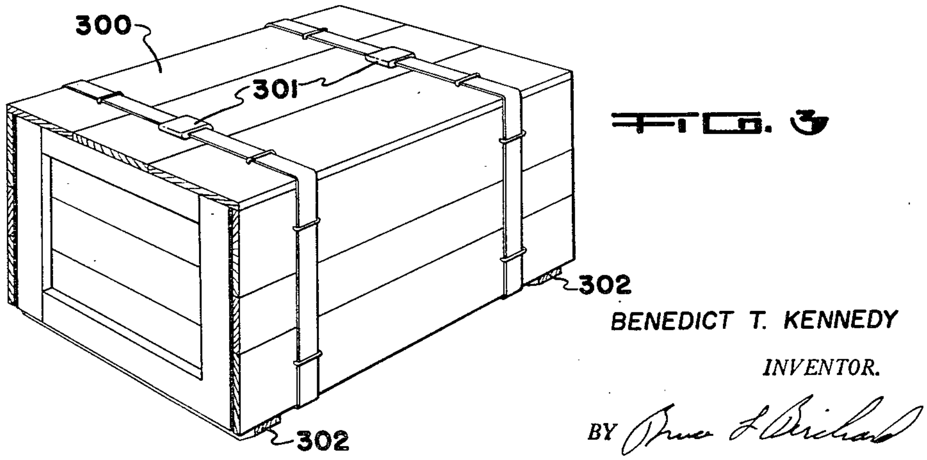
Figure 3 is a perspective view of the sealed and mounted electronic unit of Figure 2 completely crated and ready for shipment.

In Figure 3 crating 300 is disposed over sealed electronic unit 14 and is secured to base 210 by means of bradded steel strappings 301 and "toe-nails" 302.

Slight design modification will permit the deletion of base 210 and the securing of crating 300 to base pallet 202 directly.

While this invention is relatively simple, yet the great advantages it offers and the fact that companies skilled in the packaging art have not heretofore invented the present packaging method is evidence of its novelty and of it being inobvious to those skilled in the art. Indeed, the present method of packaging electronic equipment preparatory to shipment thereof displays considerable promise in advancing the electronic equipment packaging art.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a shipping carton, in combination, an item of electronic equipment, cushioning material wrapped about said electronic equipment, a sealed moisture- and vapor-proof protective cover enclosing said wrapped electronic equipment, a base pallet having an upper rectangular indentation area, an angularly disposed cushioning material positioned along the lower indentation edges of said base pallet, means for securing said wrapped and sealed electronic equipment to said base pallet in position on said cushioning material, a rectangular base element, attachment means for affixing said pallet-secured electronic equipment to said rectangular base element, said means being exteriorly disposed with respect to said wrapped and sealed electronic equipment, and a crate affixed to said rectangular base element for enclosing said wrapped electronic equipment.

2. Apparatus according to claim 1 in which said attachment means comprise a plurality of upwardly oriented bolts affixed to said rectangular base element, said base pallet being provided with mounting apertures cooperating with said bolts, and a plurality of nuts in engaging relationship with said bolts and tightened against said base pallet.

References Cited in the file of this patent

UNITED STATES PATENTS

| | | |
|---|---|---|
| 359,438 | Getleson | Mar. 15, 1887 |
| 667,755 | Wright | Feb. 12, 1901 |
| 2,328,356 | Ott | Aug. 31, 1943 |
| 2,458,695 | Edelston | Jan. 11, 1949 |
| 2,516,124 | Kishibay | July 25, 1950 |